United States Patent [19]

Hayakawa et al.

[11] Patent Number: 4,736,653

[45] Date of Patent: Apr. 12, 1988

[54] POWER TRANSMISSION

[75] Inventors: Yoichi Hayakawa, Toyoake; Kozo Kato, Aichi; Kazuaki Watanabe; Yoshiharu Harada, both of Toyota; Chihiro Hosono, Anjo, all of Japan

[73] Assignees: Aisin-Warner Limited, Anjo; Toyota Jidosha Kabushiki Kaisha, Toyota, both of Japan

[21] Appl. No.: 761,382

[22] Filed: Aug. 1, 1985

[30] Foreign Application Priority Data

Aug. 2, 1984 [JP] Japan .................. 59-163631
Aug. 23, 1984 [JP] Japan .................. 59-175618

[51] Int. Cl.⁴ .............................................. F16H 3/44
[52] U.S. Cl. ........................ 74/785; 74/665 GA; 74/606 R
[58] Field of Search .............. 74/665 GA, 785, 786, 74/758, 759, 761, 740, 606 R; 192/85 AA, 70.13; 180/244

[56] References Cited

U.S. PATENT DOCUMENTS

| 3,353,641 | 11/1967 | Chana | 192/85 AA |
| 3,379,293 | 4/1968 | Hill | 192/85 AA |
| 3,424,031 | 1/1969 | Stockton | 74/759 |
| 3,466,947 | 9/1969 | Smith | 74/759 |
| 3,602,055 | 8/1971 | Hause | 74/759 |
| 3,747,436 | 7/1973 | Hause | 74/759 |
| 4,369,671 | 1/1983 | Matsumoto et al. | 74/785 |
| 4,444,073 | 4/1984 | Moroto et al. | 74/740 |
| 4,503,927 | 3/1985 | Hayakawa et al. | 74/740 |
| 4,559,849 | 12/1985 | Ahlen et al. | 74/761 |

FOREIGN PATENT DOCUMENTS 2107008 4/1983 United Kingdom .................. 74/759

Primary Examiner—Leslie A. Braun
Assistant Examiner—David Novais
Attorney, Agent, or Firm—Spencer & Frank

[57] ABSTRACT

In a clutch mechanism for a power transmission system which effects engagement and disengagement between a central shaft and an outer peripheral shaft provided on the outer periphery of the central shaft, an improvement characterized by comprising splines provided on the outer periphery of the central shaft, and an inner tube of an annular clutch cylinder containing a piston of a fluid actuator and a clutch plate of a multiple disk clutch, the inner tube being fitted on the outer periphery of the central shaft through the splines.

3 Claims, 4 Drawing Sheets

POWER TRANSMISSION

BACKGROUND OF THE INVENTION

1. Field of the Invention

The present invention relates to a power transmission system such as a speed change gear for a four-wheel drive.

2. Description of the Prior Art

A clutch mechanism of a power transmisssion system for a vehicle which changes over drive states, for example, between the two-wheel drive state and the four-wheel drive state, has a clutch which effects engagement and disengagement between two shafts: a central shaft which drives wheels on one side of the vehicle; and an outer peripheral shaft which transmits power to wheels on the other side. The clutch cylinder of this clutch has heretofore been supported on the outer periphery of the outer peripheral shaft, which fact disadvantageously makes it difficult for a subsidiary transmission to be reduced in its axial direction and unfavorably complicates the arrangement of an oil line for supplying working oil to a hydraulic servo provided in the hydraulic cylinder.

Further, a conventional power transmission system for a vehicle has, as shown in FIG. 5, a casing 509 which is composed of a transmission casing 503, an input-side casing 505a, a front casing 505b, a front sprocket casing 506, a rear sprocket casing 507 and an extension housing 508. The transmission casing 503 is provided therein with a main transmission mechanism. The input-side casing 505a is fastened to the transmission casing 503 and receives an input shaft 520 of a transfer 510 which constitutes the power transmission system, the input shaft 520 serving as the output shaft of the main transmission mechanism and having a governor valve 510a secured thereto. The input-side casing 505a further receives a first output shaft 581 of the transfer 510 which is disposed at the rear (rightwardly as viewed in FIG. 5) of and coaxially with the input shaft 520, and a second output shaft 561 which is disposed in parallel to the first output shaft 581. Furthermore, the input-side casing 505a houses a hydraulically-actuate clutch $C_3$ actuated by a hydraulic servo C-3 which is constituted by a cylinder 553 and a piston 554 received therein. In addition, the input-side casing 505a has an oil pan 592 fastened to the lower side thereof. The front casing 505b contains a planetary gear transmission mechanism 505A having a planetary gear set Pf and a hydraulically-actuated brake $B_4$ which is actuated by a hydraulic servo B-4. The planetary gear set Pf is constituted by a sun gear $S_1$, a planetary pinion P, a ring gear $R_1$ and a carrier $P_1$, while the hydraulic servo B-4 is constituted by a cylinder 551 defined by a portion of an intermediate support wall which supports the first output shaft 581 and a piston 552 received in the cylinder 551. The front sprocket casing 506 contains a mechanism 506A which changes over drive states between the two-wheel drive and the four-wheel drive and the front portion of each of the sprockets 566 and 575. The mechanism 506A is constituted by a hydraulically-actuated clutch $C_4$ which is actuated by a hydraulic servo C-4 constituted by a cylinder 563 and a piston 564 received therein. The rear sprocket casing 507 houses a link mechanism 576 which is constituted by the sprocket 566 connected to a sleeve 567, the sprocket 575 connected to the second output shaft 561 and a chain 574 stretched between these sprockets 566 and 575. The extension housing 508 houses a speedometer drive gear 583. Thus, the conventional power transmission system enables changeover between the two-wheel drive, the high-speed four-wheel drive and the low-speed four-wheel drive during the traveling of the vehicle by virtue of the combination of the planetary gear set Pf, the clutches $C_3$, $C_4$ and the brake $B_4$.

The transfer 510 serving as a power transmission system for a vehicle and arranged as above, however, suffers from the following disadvantage. Namely, since the cylinder 551 of the hydraulic servo B-4 for the brake $B_4$ is integrally formed with the front casing 505b and is employed as a casing for the purpose of preventing any damage to transfer elements when they are mounted and the casings are bolted to each other, the number of sections of the casing 509 is disadvantageously increased, which fact involves a fear of working oil leaking out from the casing 509 of the power transmission system.

SUMMARY OF THE INVENTION

It is a first object of the present invention to provide a clutch mechanism for a power transmission system which enables reduction in the axial dimension of the transmission system and simplification of the arrangement of the oil line for supplying working oil into the hydraulic cylinder.

It is a second object of the present invention to provide a power transmission system for a vehicle which enables minimization of the number of sections of the casing thereof and hence reduction in the number of portions of the casing which involve a fear of working oil leaking out.

To these ends, according to one aspect of the present invention, there is provided a clutch mechanism for a power transmission system which effects engagement and disengagement between a central shaft and an outer peripheral shaft provided on the outer periphery of the central shaft, wherein splines are provided on the outer periphery of the central shaft, and an inner tube of an annular clutch cylinder is fitted on the outer periphery of the central shaft through the splines, the inner tube containing a piston of a fluid actuator and a clutch plate of a multiple disk clutch.

The clutch mechanism for a power transmission system according to the invention, arranged as above, offers the following advantageous effects.

(a) Splines are provided on the outer periphery of the central shaft, and the annular clutch cylinder of the clutch which effects engagement and disengagement between the central shaft and the outer peripheral shaft is supported on the outer periphery of the central shaft through the splines. It therefore becomes unnecessary to provide a space for disposing a supporting means such as a bush and hence reduce the axial dimension of the power transmission system.

(b) Splines are provided on the outer periphery of the central shaft which drives wheels on one side of the vehicle, and the annular clutch cylinder of the clutch, which effects engagement and disengagement between the central shaft and the outer peripheral shaft disposed on the outer periphery of the central shaft and adapted to transmit power to wheels on the other side, is fitted on the outer periphery of the central shaft through the splines, whereby it is possible for the clutch cylinder to be provided on the outer periphery of the central shaft without being through the outer peripheral shaft. It is therefore possible to provide a working oil supply line in the space between the central shaft and the inner tube of the clutch cylinder, so that the arrangement of the oil line for supplying working oil to the clutch can be simplified.

(c) Since the oil supply line can be provided in the space between the central shaft and the inner tube of the hydraulic cylinder, it is possible to reduce the axial dimension of the power transmission system.

According to another aspect of the present invention, there is provided a power transmission system for a vehicle having: an input shaft; a first output shaft disposed in series to the input shaft; a second output shaft disposed in parallel to the first output shaft; a transmission mechanism with a hydraulically-actuated brake connected between the input shaft and the first output shaft; a hydraulically-actuated clutch which disengageably connects the first and second output shafts; a first casing which houses the transmission mechanism; a second casing which houses the clutch; and a support wall which supports the first output shaft and is formed from a member which is independent of the first and second casings. In this system, the support wall is designed to form a cylinder for the brake, a first oil line for supplying working oil pressure to the brake and a second oil line for supplying working oil pressure to the clutch.

By virtue of the above-described arrangement, the power transmission system of the invention offers the following advantageous effects:

(a) Since the support wall is adapted to support the first output shaft and is formed from a member which is independent of the first and second casings, it is possible for elements such as a hydraulically-actuated brake and clutch to be easily mounted on the first and second casings and to minimize the number of sections of the casing of the power transmission system. It is therefore possible to increase the rigidity of the casing and reduce the number of required fastening bolts.

(b) It is possible to reduce the number of portions of the second casing which involve a fear of working oil leaking out.

(c) It is possible to improve the workability of the casing of the power transmission system as compared with an arrangement in which the casing of a power transmission system has the same function as that of a center support.

The above and other objects, features and advantages of the present invention will become clear from the following description of the preferred embodiments thereof, taken in conjunction with the accompanying drawings.

DESCRIPTION OF THE PREFERRED EMBODIMENTS

The clutch mechanism for a power transmission system according to the present invention will first be described through one embodiment with reference to the accompanying drawings.

Figure 1:
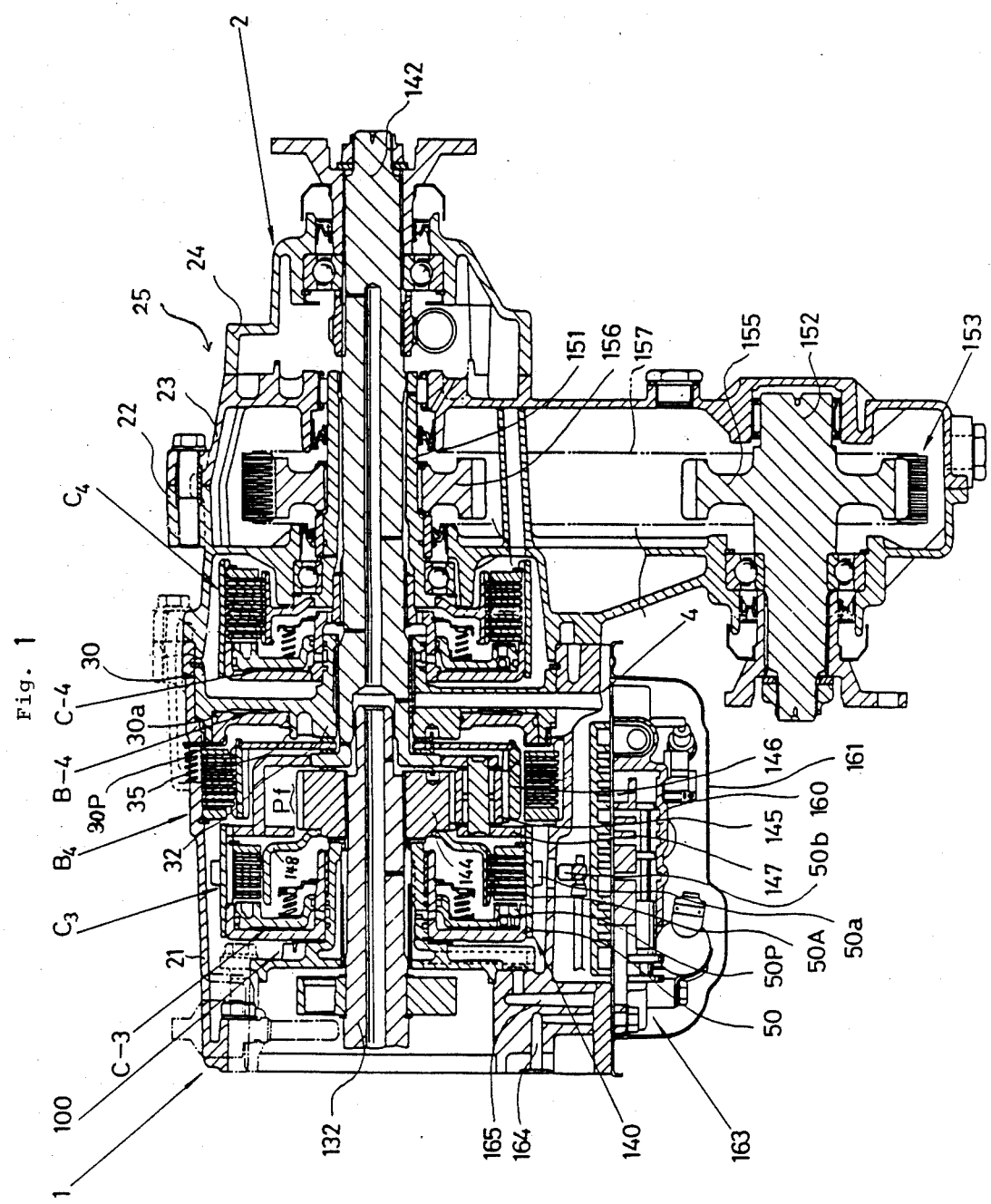
FIG. 1 is a sectional view of a power transmission system equipped with the clutch mechanism according to the present invention.
Figure 2:
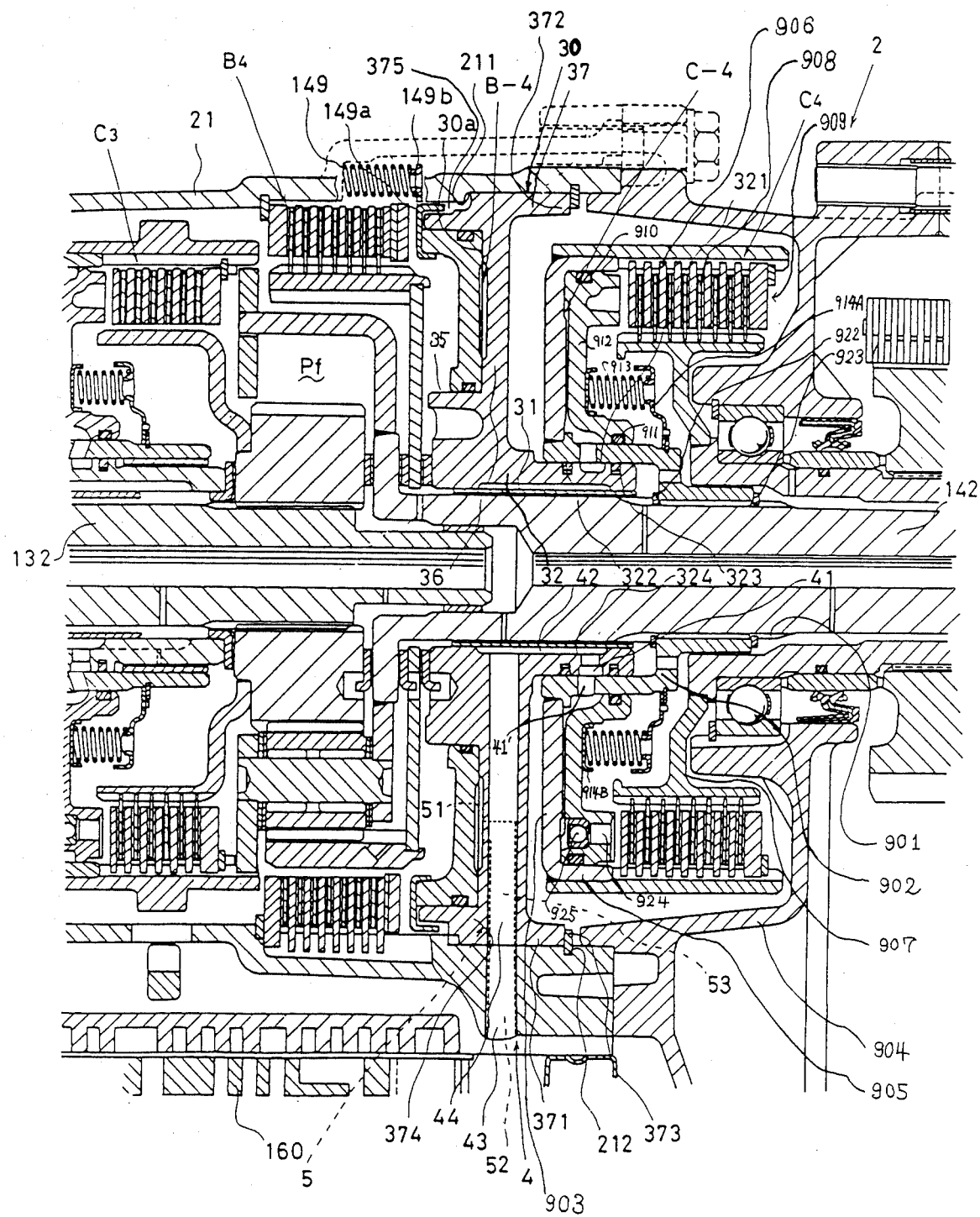
FIG. 2 is an enlarged view of an essential portion of the power transmission system shown in FIG. 1.

FIG. 1 is a sectional view of a power transmission system 1 for four-wheel drive which incorporates the clutch mechanism according to the invention, while FIG. 2 is an enlarged view of an essential portion of the transmission system 1.

A transfer 100 has a first output shaft 142, a planetary gear transmission mechanism 140, a four-wheel drive sleeve 151, a second output shaft 152 and a transmission mechanism 153. The first output shaft 142 is disposed in series to an input shaft 132 which comprises an output shaft within a main transmission (not shown), the first output shaft 142 serving as a central shaft which drives wheels on one side of the vehicle. The planetary gear transmission mechanism 140 is disposed between the input shaft 132 and the first output shaft 142. The four-wheel drive sleeve 151 is rotatably fitted on the outer periphery of the first output shaft 142 so as to serve as an outer peripheral shaft which transmits power to wheels on the other side of the vehicle. The second output shaft 152 is disposed in parallel to the first output shaft 142 so as to receive the power transmitted by the sleeve 151. The transmission mechanism 153 transmits power from the sleeve 151 to the second output shaft 152.

The planetary gear transmission mechanism 140 includes a planetary gear set Pf which comprises a sun gear 144 spline-fitted on the outer periphery of the rear end portion of the input shaft 132, a pinion 145 meshed with the sun gear 144, a ring gear 146 meshed with the pinion 145, and a carrier 147 connected to the outer periphery of the distal end of the first output shaft 142 so as to rotatably retain the pinion 145. The planetary gear transmission mechanism 140 further includes: a clutch $C_3$ which effects engagement and disengagement between the sun gear 144 and the carrier 147 so as to change over drive states between the high-speed two-wheel drive, the high-speed four-wheel drive and the low-speed four-wheel drive; a brake $B_4$ which effects engagement and disengagement between the extension casing 21 of the transfer 100 and the ring gear 146; and a clutch $C_4$ which effects engagement and disengagement between the first output shaft 142 and the sleeve 151.

The clutch mechanism according to the invention is applied to the clutch $C_4$. The clutch mechanism comprises: splines 901 provided on the outer periphery of the first output shaft 142; an inner peripheral tubular portion 902 fitted on the outer periphery of the output shaft 142 through the splines 901; an annular clutch drum 905 comprising a disk-like portion 903 and an outer peripheral tubular portion 904 which are welded together; a multiple disk clutch 909 comprising outer peripheral multiple disk elements 906 which are spline-fitted on the inner periphery of the outer peripheral tubular portion 904 and inner peripheral multiple disk elements 908 which are spline-fitted on the outer periphery of an annular member 907 connected to the distal end portion of the sleeve 151, each of the elements 908 having a friction element, and the outer and inner peripheral multiple disk elements 906 and 908 being alternately combined together; a clutch piston 912 received in the clutch drum 905 through O-rings 910 and 911; a hydraulic servo C-4 formed between the clutch drum 905 and the clutch piston 912 such as to drive the clutch piston 912; and return spring mounting members 914A and 914B provided on the outer periphery of the inner peripheral tubular portion 902, the members 914A and 914B being used to mount a return spring 913 which presses the clutch piston 912 toward the clutch drum 905 when the pressure oil in the hydraulic servo C-4 is discharged. The supply line for supplying working oil to the hydraulic servo C-4 comprises an oil line 44 which is formed within a center support portion 32 which is provided adjacent to the clutch drum 905 and adapted to rotatably retain the first output shaft 142. The working oil supplied through the oil line 44 is introduced into an oil line 42 which is formed on the inner periphery of the center support portion 32. The working oil then flows into an oil line 41 from the inner peripheral side of the tubular portion of the center support portion 32 which is disposed between the inner peripheral tubular portion 902 and the first output shaft 142. Then, the working oil is supplied to the hydraulic servo C-4 through an oil line 41' which is provided in the inner peripheral tubular portion 902. Seal rings 322 and 323 are provided on the outer periphery of the tubular portion of the center support 32 which contacts the inner periphery of the inner peripheral tubular portion 902, the seal rings 322 and 323 preventing leakage of the working oil flowing through the oil lines 41 and 41'.

The inner most portion of the inner peripheral tubular portion 902 is secured at both its ends by means of snap rings 922 and 923 so that it is prevented from moving on the splines 901. The clutch piston 912 is provided with a bore 924 which allows the hydraulic servo C-4 to communicate with the outside. A check valve 925 is disposed in the bore 924, the valve 925 being adapted to close the bore 924 when working oil is supplied to the hydraulic servo C-4 and to open the bore 924 when the working oil is discharged from the hydraulic servo C-4. It is to be noted that the clutch $C_4$ is a hydraulically-operated multiple disk friction engagement clutch which effects engagement and disengagement between the first output shaft 142 connected to the carrier 147 and the four-wheel drive sleeve 151 connected to an input-side sprocket 156 of the transmission mechanism 153 for driving the second output shaft 152 of the transfer 100. The transmission mechanism 153 comprises the input-side sprocket 156 spline-fitted on the sleeve 151, an output-side sprocket 155 formed on the second output shaft 152, and a chain 157 stretched between these sprockets 156 and 155.

The clutch $C_3$ effects engagement and disengagement between the sun gear 144 and the carrier 147. The clutch $C_3$ is connected to the carrier 147 and has a parking gear 50a circumferentially provided on its outer periphery. The arrangement is such that, when the shift lever of the automatic transmission is selected in the parking position, a locking pawl 50b engages with the parking gear 50a. The clutch $C_3$ is actuated by a hydraulic servo C-3 which comprises a hydraulic cylinder 50 connected to the carrier 147 and a clutch piston 50P received in the cylinder 50.

The brake $B_4$ is a hydraulically-operated multiple disk friction engagement brake for engaging the ring gear 146 with the extension casing 21. The brake $B_4$ is actuated by a hydraulic servo B-4 which comprises an annular hydraulic cylinder 30a defined by the left side portion of an annular plate portion 36 and a piston 30p received in the cylinder 30d.

The reference numeral 163 denotes a transfer valve body which is provided with a hydraulic pressure controller 160 which supplies and discharges hydraulic pressure to and from the respective hydraulic servos C-3, C-4 and B-4 of the clutches $C_3$, $C_4$ and the brake B-4, while the numeral 161 represents an oil pan for the valve body 163. The line pressure oil which is supplied to the hydraulic servos C-3, C-4 and B-4 is introduced to the transfer valve body 163 through an oil line 164 which is provided in the main transmission casing and the extension casing 21.

The following is a description of the power transmission system for a vehicle according to the invention with reference to FIGS. 1 to 4.

In this embodiment, the transmission system 1 of the invention is applied to a four-wheel drive transfer 100 of an automatic transmission for four-wheel drive. The transfer 100 comprises a tubular extension casing 21, an intermediate support wall 30 a hydraulically-actuated clutch $C_4$, a planetary gear transmission mechanism 140 and oil lines 4 and 5. The extension casing 21 is tubular and serves as a first casing. The intermediate support wall 30 is fixedly fitted in the extension casing 21. The input-side portion (the left-side portion as viewed in FIGS. 1 and 2) of the support wall 30 is designed to provide an annular hydraulic cylinder 30a of a hydraulic servo B-4 for a hydraulically-actuated brake $B_4$. The support wall 30 has at its center a center support portion 32 including an annular boss portion 35, the center support portion 32 rotatably supporting a first output shaft 142. The clutch $C_4$ is fitted on the outer periphery of the boss portion 35 as well as being spline-fitted on the first output shaft 142 so as to effect changeover between the two-wheel drive and the four-wheel drive. The planetary gear transmission mechanism 140 includes a planetary gear set Pf, a hydraulically-actuated actuated clutch $C_3$ for transmission and the friction brake $B_4$ which are housed within the extension casing 21 in front of the intermediate support wall 30. The mechanism 140 is disposed between an output shaft 132 of a planetary gear transmission mechanism (not shown) of the automatic transmission housed in the transmission casing and the first output shaft 142 of the transfer 100 which is disposed in series to the output shaft 132 serving as an input shaft of the transfer 100. The oil lines 4 and 5 are provided within the intermediate support wall 30 so as to supply working oil to respective hydraulic servos C-4 and B-4 of the clutch $C_4$ and the brake $B_4$.

A transfer casing 2 comprises the extension casing 21 serving as a first casing, front and rear sprocket casings 22 and 23 which contain the clutch $C_4$ and a transmission mechanism 153, and a second casing 25 comprising an extension housing 24 from which the first output shaft 142 projects.

Figure 3:
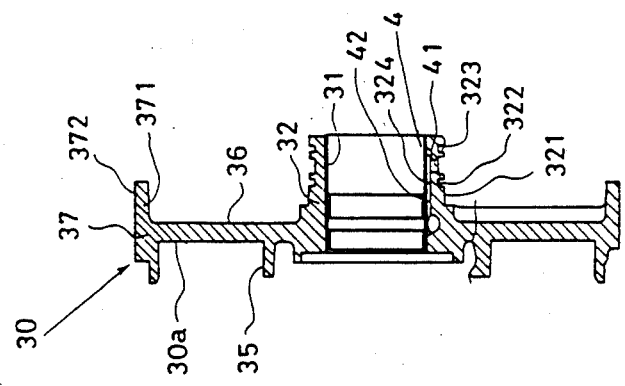
FIG. 3 is a sectional view of an intermediate support wall in the power transmission system for a vehicle according to the present invention.
Figure 5:
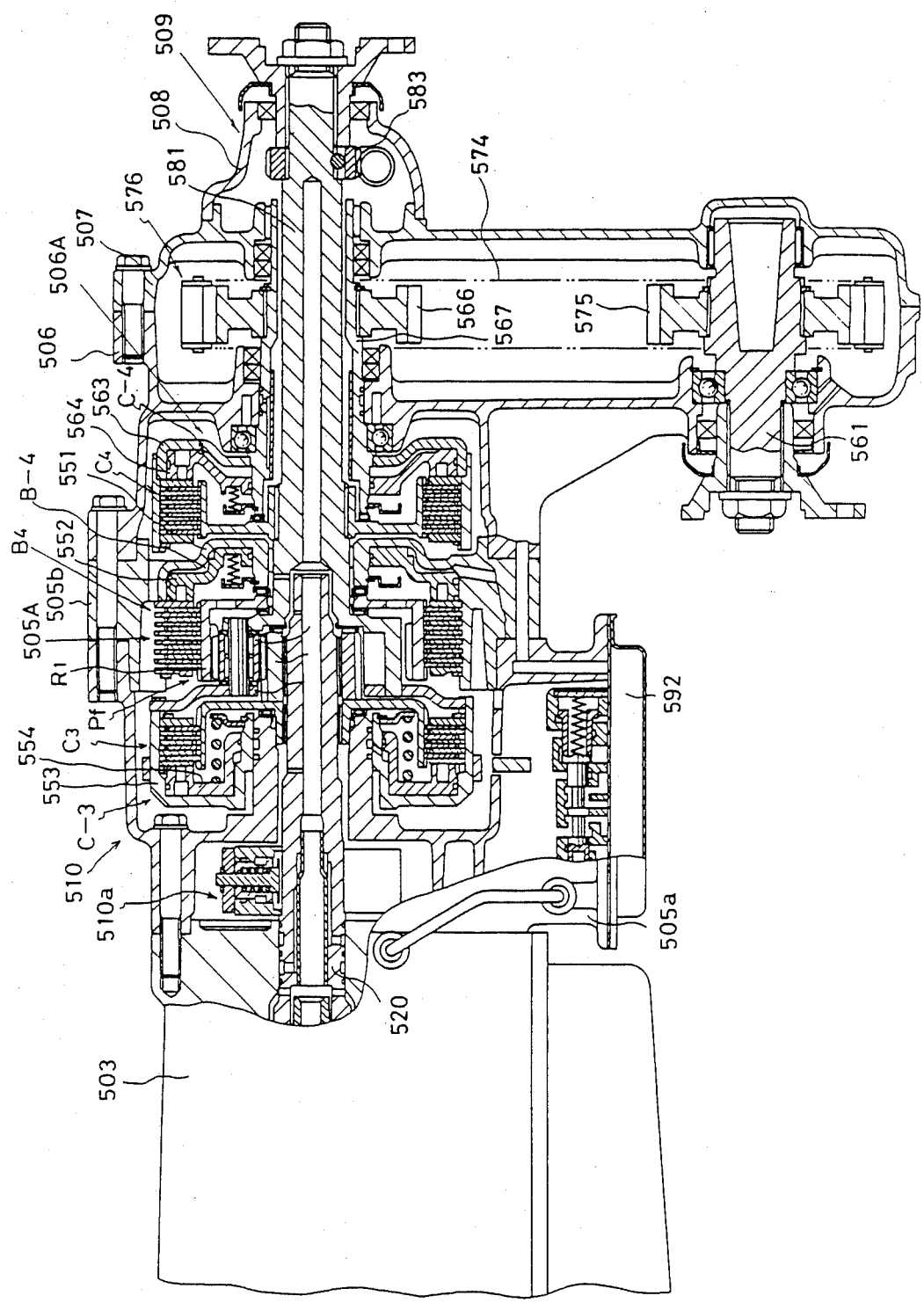
FIG. 5 is a sectional view of a conventional power transmission system for a vehicle.

The intermediate support wall 30 is, as shown in FIGS. 2 and 3, disposed between the brake $B_4$ and the clutch $C_4$ which effects changeover between the two-wheel drive and the four-wheel drive. The support wall 30 has a center support portion 32 which rotatably supports the first output shaft 142 through a bash 31 press-fitted between the center support portion 32 and the shaft 142, an annular plate portion 36 which extends radially outward from the center support portion 32, and a tubular fitting portion 37 formed on the outer periphery of the annular plate portion 36 so as to fit to the inner wall 211 of the extension casing 21. Further, a portion of the support wall 30 defines the annular hydraulic cylinder 30a of the hydraulic servo B-4 for the brake B4. In addition, the support wall 30 is provided therein with the oil lines 4 and 5 for supplying working oil to the respective hydraulic servos B-4 and C-4 of the brake B4 and the clutch C4.

Figure 4:
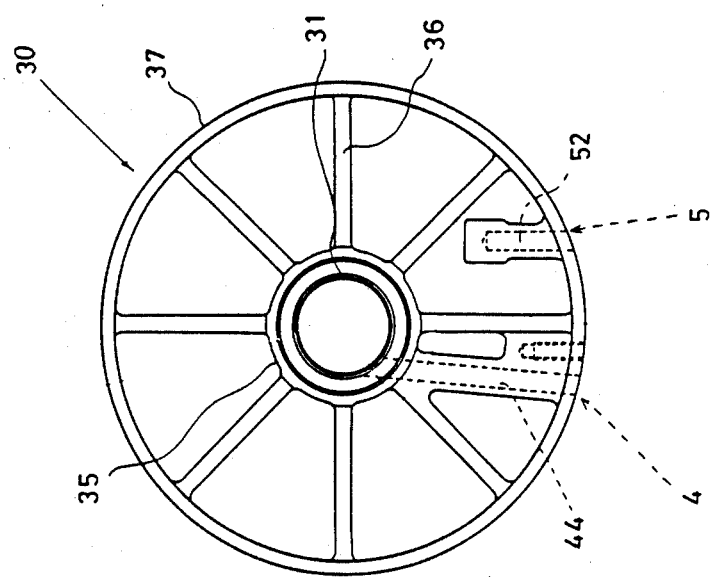
FIG. 4 is a front elevational view of the support wall shown in FIG. 3.

The intermediate support wall 30 has, as shown in FIGS. 2, 3 and 4, two seal ring grooves 322 and 323 on the outer periphery 321 of the center support portion 32. A clutch working oil hole 41 is formed between the grooves 322 and 323 for supplying working oil to the hydraulic servo C-4 for the clutch C4. An oil reservoir 42 is defined between the bush 31 and the inner periphery 324 of the center support portion 32. The fitting portion 37 is fitted to the inner wall 211 of the extension casing 21 in such a manner that the distal end 372 of a projecting portion 371 which projects from the annular plate portion 36 toward the output side (toward the right-hand side as viewed in FIGS. 2 and 3) is secured by a snap ring 373 which is fitted into a ring groove 212 formed on the inner wall 211. A space 375 is defined between a projecting portion 374 of the support wall 30 which projects from the annular plate portion 36 toward the transmission casing (toward the left-hand side as viewed in FIG. 2) and the inner wall 211 of the extension casing 21. Thus, when the brake B4 is released or disengaged, the space 375 receives a pawl portion 149b of a flange plate 149a which supports a return spring 149 for the piston 30p.

The oil line 4 comprises the clutch working oil hole 41 and a clutch working oil supply oil line 44 which provides communication between the oil reservoir 42 and the transfer valve body 163 through an oil line 43 which is provided in the wall of the extension casing 21.

On the other hand, the oil line 5 comprises a brake working oil hole 51 for supplying working oil to the hydraulic servo B-4 for the brake B4 formed inside the annular hydraulic cylinder 30d and a brake working oil supply oil line 53 which provides communication between the oil hole 51 and the transfer valve body 163 through an oil line 52 which is provided in the wall of the extension casing 21.

In an ordinary running state, the hydraulic servo C-3 is supplied through an oil line 165 with the line pressure, which is supplied to the hydraulic pressure controller of the automatic transmission, so as to engage the clutch C3, while the pressure oil in the hydraulic servos B-4 and C-4 is discharged so as to disengage the brake B4 and the clutch C4. Thus, the sun gear 144 and the carrier 147 of the planetary gear set Pf are connected, and power is thereby transmitted from the input shaft 132 to the first output shaft 142 alone at a reduction gear ratio of 1, whereby it is possible to obtain a two-wheel drive which is effected by the rear wheels alone. At this time, the power from the input shaft 132 is transmitted to the first output shaft 142 from the carrier 147 through a coupling member 148 secured to the sun gear 144 and the direct drive clutch C3. For this reason, no load is imposed on the tooth surface of each of the gears, and the life of each gear is therefore increased. When, during this two-wheel drive, a four-wheel drive is required, the shift lever (not shown) which is, for example, provided at the driver's seat is shifted by hand. In consequence, the hydraulic pressure controller 160 causes the line pressure to be gradually supplied to the hydraulic servo C-4 so that the clutch C4 is smoothly engaged. Thereupon, the first output shaft 142 and the four-wheel drive sleeve 151 are coupled together, so that power is also transmitted to the front wheels through the transmission mechanism 153, the second output shaft 152 and a propeller shaft (not shown). This, power is transmitted from the input shaft 132 to both the first and second output shafts 142 and 152 at a reduction gear ratio of 1, thereby obtaining a four-wheel direct-coupled drive state (a high-speed four-wheel drive state). When, during this four-wheel drive state, the shift level is manually shifted in order to increase the output torque for the purpose of, for example, going up a steep slope, the hydraulic pressure actuates an inhibitor valve serving as a selector valve which effects changeover between the high-speed four-wheel drive state and the low-speed four-wheel drive state and an accumulator control valve which serves a a spool valve. In consequence, the hydraulic servo B-4 is gradually supplied with the line pressure, and the hydraulic pressure in the hydraulic servo C-3 is discharged at an appropriate timing, whereby the reduction brake B4 is gradually engaged and the reduction clutch C3 is smoothly disengaged. Thus, the sun gear 144 and the carrier 147 are disengaged from each other, and the ring gear 146 is fixed. As a result, power is transmitted from the input shaft 132 to both the first and second output shafts 142 and 152 while being reduced in speed through the sun gear 144, the pinion 145 and the carrier 147, thereby obtaining a four-wheel drive state (a low-speed four-wheel drive state) with a relatively large torque.

Table 1 below shows the manual shift selection range of the transfer 100, various running states of the vehicle and how each of the friction engagement elements, such as the brake B4 and the clutches C3, C4, is engaged or disengaged in accordance with the running state of the vehicle.

TABLE 1

| Manual shift selection range | Running state | Friction engagement elements $C_3$ $B_4$ $C_4$ | Reduction gear ratio |
|---|---|---|---|
| H2 | High-speed 2-wheel drive | O X X | 1 |
| H4 | High-speed 4-wheel drive | O X O | 1 |
| L4 | Low-speed 4-wheel drive | X O O | $1 + 1/r$ |

In Table 1, O represents the engaged state of each of the friction engagement elements, and X the disengaged state thereof. The reduction gear ratio r represents the ratio of the number of teeth of the sun gear 144 of the planetary gear set Pf to the number of teeth of the ring gear 146. If the ratio is 0.5, the reduction gear ratio is 3.0.

What is claimed is:
1. A power transmission system for a four-wheel drive, comprising
 an input shaft,
 a first output shaft provided in axial alignment with the input shaft,
 a sleeve provided coaxially on an outer periphery of the first output shaft,
 a second output shaft provided in parallel with the sleeve,
 a planetary gear transmission mechanism for establishing high-speed and low-speed drive, having
  a multi-element planetary gear set connected between the input shaft and the first output shaft, said planetary gear set including
  a sun gear, a carrier,
a pinion supported by the carrier and meshed with the sun gear, and
a ring gear meshed with the pinion, a first clutch connected between a first and a second element of the planetary gear set connected to the input shaft and the first output shaft, respectively,
a brake connected to a third element of the planetary gear set,
a casing housing the planetary gear set, the first clutch and the brake, and
a center support connected to said casing to form a cylinder of the brake,
a transmission mechanism connected between the sleeve and the second output shaft to establish a four-wheel drive, and
a clutch mechanism for selectively establishing a two-wheel drive or a four-wheel drive via the transmission mechanism, said clutch mechanism having
a second clutch connected between the first output shaft and the sleeve, said second clutch including
a cylinder connected to the first output shaft, said cylinder of the second clutch having an inner peripheral tubular portion supported at an inside of the center support and splined to be connected to the first output shaft,
seal rings provided between the center support and inner peripheral tubular portion,
an annular member connected to the sleeve,
a multiple disk element connected between the cylinder and an annular member,
a clutch piston disposed in the cylinder to be slidable axially, and
an oil passage formed in the center support and connected to an oil passage between the seal rings to selectively supply an oil passage fluid to a portion between the cylinder and the piston, via said casing and the center support.

2. A power transmission system according to claim 1, wherein said center support is formed on its outer periphery with a recess for fitting a return spring for a piston of said brake.

3. A power transmission system as defined in claim 1, wherein said casing is a first casing; further comprising a second casing directly connected to said first casing and housing said transmission mechanism and said clutch mechanism.

* * * * *